US006640962B2

(12) United States Patent
Richardson

(10) Patent No.: US 6,640,962 B2
(45) Date of Patent: Nov. 4, 2003

(54) INTERLOCKING TRANSFER SYSTEM

(76) Inventor: Jerral Richardson, 3162 N. Ellis Dr., Unit 110, Volo, IL (US) 60073

(*) Notice: Subject to any disclaimer, the term of this patent is extended or adjusted under 35 U.S.C. 154(b) by 20 days.

(21) Appl. No.: 09/965,382

(22) Filed: Sep. 27, 2001

(65) Prior Publication Data

US 2003/0057060 A1 Mar. 27, 2003

(51) Int. Cl.$^7$ .............................................. B65G 37/00
(52) U.S. Cl. ................................... 198/580; 198/343.1
(58) Field of Search ........................ 198/343.1, 346.1, 198/465.2, 580, 346.3, 750.14, 750.2, 773, 774.1, 774.2, 465.1

(56) References Cited

U.S. PATENT DOCUMENTS

| 3,666,086 | A | | 5/1972 | Brockmann |
| 4,515,264 | A | * | 5/1985 | Sticht ............................ 198/375 |
| 4,704,792 | A | * | 11/1987 | Itagaki et al. .................. 29/741 |
| 4,722,653 | A | * | 2/1988 | Williams et al. ......... 414/222.13 |
| 4,982,553 | A | * | 1/1991 | Itoh ............................. 53/246 |
| 5,143,198 | A | * | 9/1992 | Hale et al. ................... 198/414 |
| 5,190,427 | A | * | 3/1993 | Lai .............................. 414/278 |
| 5,388,684 | A | * | 2/1995 | Peck ........................... 198/465.1 |
| 5,529,166 | A | * | 6/1996 | Markin et al. ............... 198/349 |
| 5,944,166 | A | | 8/1999 | Bidaud |
| 6,009,990 | A | | 1/2000 | Davis |
| 6,074,329 | A | * | 6/2000 | Hirano et al. ................. 483/15 |
| 6,193,049 | B1 | * | 2/2001 | Noda ......................... 198/346.2 |
| 6,354,431 | B1 | * | 3/2002 | DeCecca et al. ............ 198/775 |
| 6,409,438 | B1 | * | 6/2002 | Kohler ........................ 409/131 |

* cited by examiner

Primary Examiner—Christopher P. Ellis
Assistant Examiner—Richard Ridley
(74) Attorney, Agent, or Firm—Joseph S. Heino

(57) ABSTRACT

An interlocking transfer system includes a workstation having four or more sides, each of which is positioned at 90° angles from the next adjacent side. A cam lift assembly is provided on each of the sides and a means for moving the pallets horizontally. The cam lift assembly is actuated by a reciprocating cylinder which operates to lift and lower the pallets. While pallets are lifted, they are also advanced horizontally using either an external reciprocating cylinder, a motor or by hand. The interlocking transfer system of the present invention provides high efficiency and low transfer rate. It also eliminates the need for lift and locate devices, transfer space due to traffic control, and end-to-end cross transfers. The interlocking transfer system of the present invention also provides for interchangeable fixtures.

24 Claims, 6 Drawing Sheets

INTERLOCKING TRANSFER SYSTEM

FIELD OF THE INVENTION

The device of the present invention relates generally to transfer systems and the like. More specifically, it relates to automated workstations for use in production facilities.

BACKGROUND OF THE INVENTION

Many present day industries use a conveyor type transfer system, whether it is belt drive or chain drive, to transfer pallets from one point to another. Conveyor systems must either run continuously or must be stopped at each workstation. Stopping at each workstation leads to excessive wear and tear on the drivetrain of the conveyor. If the conveyor does not stop at each workstation, then there must be a device that provides for a positive stop so that work may be performed on the product. A second stop, or cue stop, is also required so that the parts that are advancing toward the workstation do not collide with the part being worked on.

The disadvantages to this type of system are obvious. First, there is the problem of belt wear. If the belt is moving and the pallet is stationary, the movement of the belt will cause wear on both the pallet and the belt. The alternate solution, stopping the conveyor at each workstation, merely switches the wear problem from the belt to the drivetrain of the conveyor.

Another problem with prior devices of this type is excessive transfer time. Conveyors generally require a three to four second cycle time for a pallet that is being worked on to move on to the next workstation and the next pallet to move into the first pallet's workstation. The device of the present invention reduces the transfer time to about one second because all of the pallets move simultaneously, thus eliminating the need for pallets to be cued up behind each workstation and thereby increasing productivity.

Prior devices also take up more space. Manufacturing space is prime real estate. Thus, bulky prior transfer devices have high overhead requirements. For example, a standard conveyor device requires a pallet at each workstation and space for a pallet in cue. The device of the present invention allows a workstation over each pallet. Thus, the device of the present invention requires only one-half the space of prior transfer systems. The device of the present invention also eliminates the need for complicated systems for transferring pallets from conveyor to conveyor, thus conserving even more space.

An additional problem is that prior devices require several drive motors to accomplish the same thing that the device of the present invention can accomplish with just a single motor. For example, a conveyor system that must turn a complete square will need at least four power sources, one for each side of the square. This inventor is also aware of several conveyor systems which require an additional operation to transfer around corners. The device of the present invention can be powered by a single cylinder, a single servo motor, or even by hand.

Prior devices are also handicapped by their requirements for multiple mechanically actuated stops around the conveyor belt for workstations and for cues before the workstation. All of the stops require some form of automation, including complicated sensors for detecting the location of pallets and complex software to keep track of all the operations occurring throughout the conveyor system. The device of the present invention virtually eliminates the requirements for sensors and software because the device is "intertwined" in such a way that each pallet moves in lockstep with every other pallet.

A further limitation of prior devices is that they require a "pick and place" operation for precision manufacturing. The device of the present invention reduces the time necessary for precision machining by providing bushings within each fixture. Thus, each workstation operation can be completed on the fixture itself, reducing the amount of time necessary for procedures and eliminating the need for pick and place machining operations. This inventor is not aware of any prior devices that accommodate this requirement with the simplicity of the device of the present invention.

The device of the present invention also offers extraordinary versatility. For example, the device may be adapted to use different size square pallets or even rectangular pallets. The device may also be assembled in virtually any configuration having 90-degree angles. For example, a manufacturer may need a very simple series of operations and employ a simple square transfer system. A manufacturer could build any design required for the particular article of manufacturing or necessitated by the floorplan of the building. The device of the present invention may also be adapted for use in clean room environments.

Lastly, prior devices require extensive maintenance. The conveyor belts and multiple drives associated with conveyor operations are difficult to maintain. In contrast, the device of the present invention allows easy access to workstations.

SUMMARY OF THE INVENTION

It is therefore a principal object of the interlocking transfer system of the present invention to provide a new, useful and uncomplicated assembly that transports fixtures or pallets to a workstation. It is also an object of the present invention to improve upon the speed and efficiency of prior conveyor devices. It is yet a further object to provide a transfer system that is capable of either manual or automated procedures. It is still another object or the present invention to eliminate the need for transfer space due to traffic control and end to end cross transfer. It is also an object of the present invention to provide an efficient way to transfer pallets around 90 degree corners. It is a further object of the present invention to provide a system that allows for pallet swapping ability and offers multiple configurations to fit floor space. It is another object of the present invention to provide a device that can be purchased for significantly less than comparable systems and that occupies less than half the space of comparable systems. It is yet another object of the present invention to provide a low-maintenance device that is suitable for use in a clean room.

The device of the present invention obtains these objects. It can be configured in any number of setups depending on both production necessities and floor space. The device of the present invention consists generally of a workstation with four or more sides positioned at 90-degree angles from one another, a cam lift assembly on each of the sides and means for moving the pallets horizontally. The cam lift assembly is actuated by a reciprocating cylinder which operates to lift and lower the pallets. While the pallets are lifted, they are also advanced horizontally using either an external reciprocating cylinder, a motor, or by hand. The device of the present invention provides a combination of high efficiency and low transfer rate. The present invention eliminates the need for lift and locate devices, transfer space due to traffic control and end-to-end cross transfers. The device of the present invention also provides for interchangeable fixtures. Further, the device of the present invention may be advanced by either manual or automatic means. Lastly, the purchase price is less than comparable conveyor systems. The foregoing and other features of the device of the present invention will be further apparent from the detailed description that follows.

DETAILED DESCRIPTION

Figure 1:
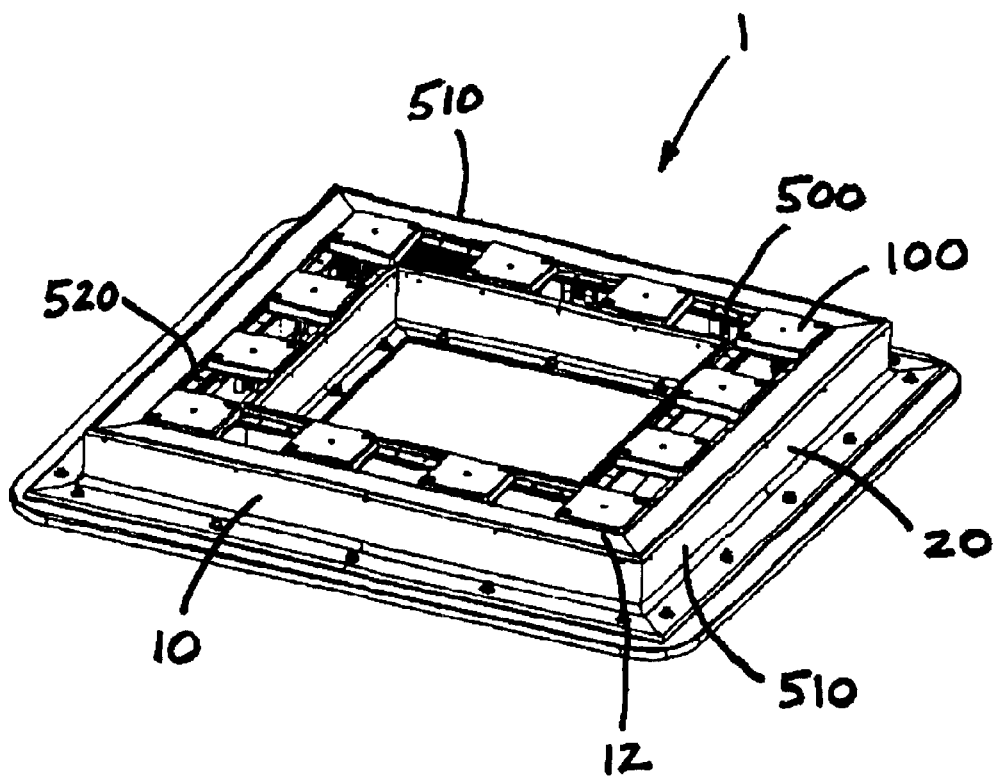
FIG. 1 is a front perspective view of one embodiment of the interlocking transfer system of the present invention.

Referring now to the drawings in detail, wherein like numbered numerals refer to like elements throughout, FIG. 1 shows the interlocking transfer system, generally identified 1, constructed in accordance with the present invention. Distilled to its essence, the device of the present invention consists generally of four or more sides with each adjacent side positioned generally perpendicularly to one another, a cam lift assembly on each of the sides and a means for moving the fixtures horizontally. Each fixture on the interlocking transfer system supports one pallet. The device of the present invention advances pallets from workstation to workstation by raising the fixtures 100 off the transfer rails 500 of the interlocking transfer system 1 with the cam lift assembly, advancing them horizontally using some means for reciprocating horizontal motion, and lowering them using the cam lift assembly. Lastly, the horizontal motion returns to its home position.

The device of the present invention can be constructed with a steel base plate and an extruded aluminum frame. The frame can also be welded steel if the tooling requires it. Tooling can be mounted on the interlocking transfer device 1 if required. The materials discussed are not meant to limit the invention in any way. They are merely present to provide examples of construction materials. Accordingly, it is to be understood that the device of the present invention could be constructed of nearly any kind of metal or hardened plastic.

Figure 2:
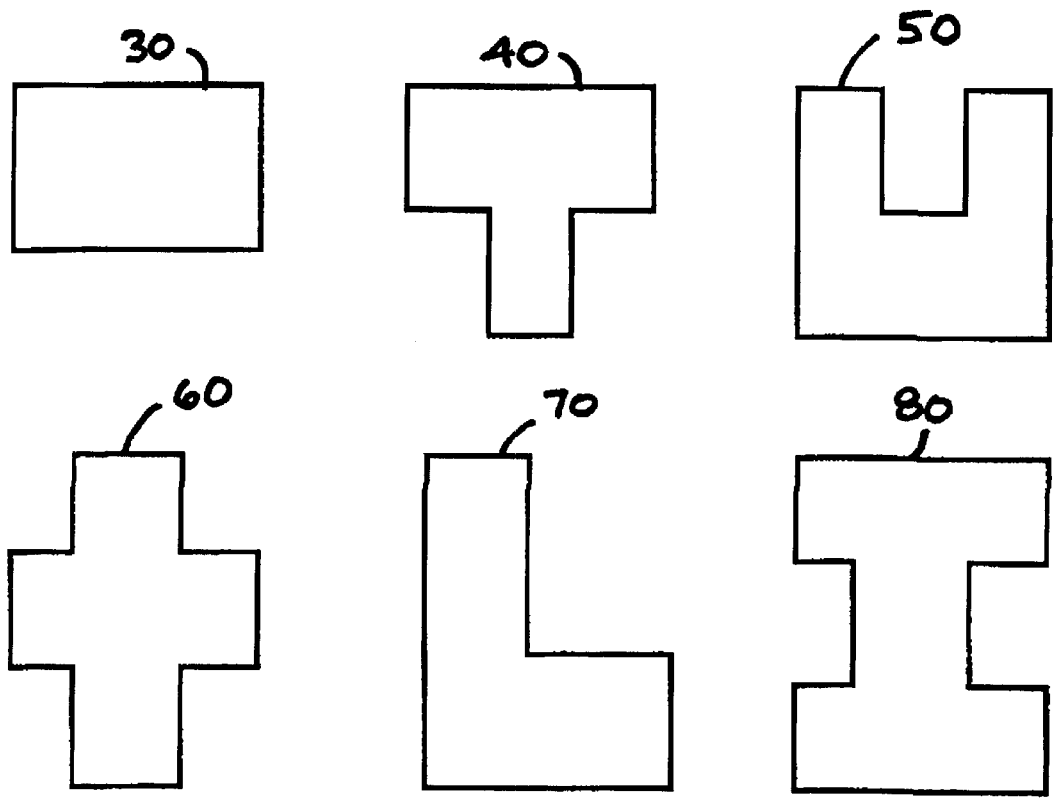
FIG. 2 is a top schematic view of several basic and alternative configurations of the interlocking transfer system.

As shown in FIG. 1 a preferred embodiment of the invention is shown in its simplest configuration, a square. The configuration shown is used to provide illumination and is not meant to serve as a limitation to the device of the present invention. In fact, as depicted in FIG. 2, the device of the present invention can be configured 30, 40, 50, 60, 70, 80 in multiple ways to take advantage of available floorspace or to provide customized subassembly stations.

In its most simple configuration, the finished product resembles a square table. Easily visible in FIG. 1 are the cover 510, the transfer rails 500, the rough locating pads 520 and the fixtures 100. The cover 510 protects the assembly from the elements and prevents the possibility of operator injury from the moving parts of the undercarriage. The transfer rails 500 provide a resting place for the fixtures 100 when they are stationary at workstations. The rough locating pads 520 consist of narrow strips attached to the transfer rails 500 to provide an approximate workstation location within the interlocking transfer system 1.

In a preferred embodiment, the device of the present invention has several fixtures 100. The fixtures 100 are used to hold pallets. (not shown) The fixtures 100 are generally square, although other shapes may be employed and have a top side and a bottom side. The bottom side of the fixture 100 features several machined holes, or keyholes 105. The keyholes 108 fit onto points, or keys 206 on the lift beam 200 and are especially important when a fixture 100 has reached the end of one side and is going around a corner of the assembly. The keys 206 provide each fixture 100 with an exact location on the lift beam 200 as the lift beam 200 elevates each of said fixtures 100. When the fixtures 100 reach the end 12 of one side 10 of the interlocking transfer system 1, a second lift beam 25 of the new side 20 will pick up the fixture 100 using either the same set of keyholes 108 or a similar set of keys keyholes positioned 90 degrees from the first set of keyholes 108. In this manner, the assembly of the present invention provides that each fixture 100 remains exactly and precisely located on the interlocking transfer system 1.

Each interlock transfer assembly 1 has at least four sides. Each side 10 functions mechanically identically. However, this is not to imply that each side 10 need be identical. To the contrary, the inventor envisions that some sides could be longer or shorter than other sides, depending on production requirements of manufacturers and the space constraints of their buildings so long as each side is generally perpendicular to its adjacent side. Some basic configurations envisioned by the inventor are depicted in FIG. 2. Despite this variability, and in the interests of simplicity and clarity, the inventor has chosen to describe the mechanism of only one side 10 of any interlocking transfer system 1 constructed in accordance with the present invention. See, for example FIG. 4, FIG. 5 and FIG. 6, depict in more detail a side of the system depicted in FIG. 3.

Figure 5:
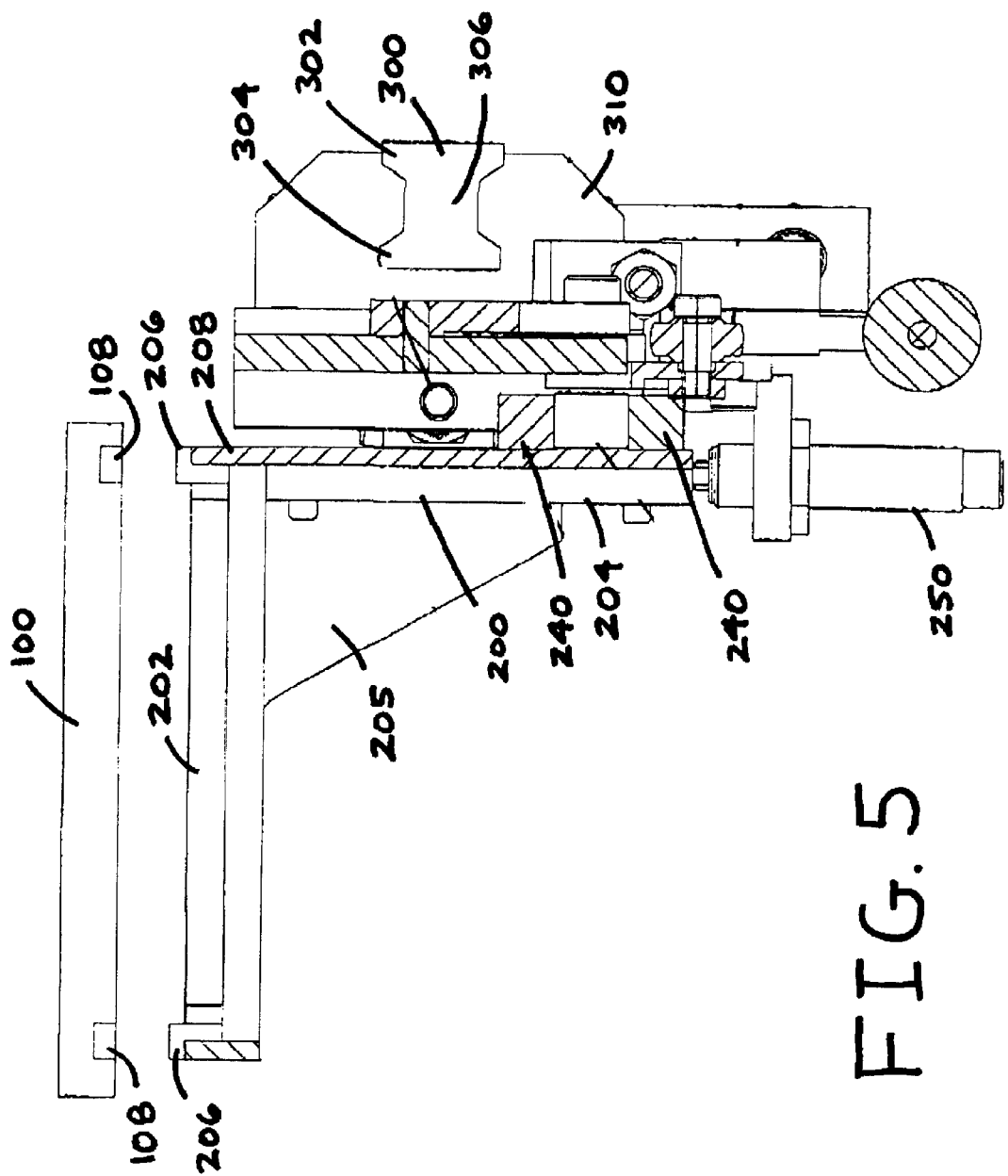
FIG. 5 is a sectional view of the subassemblies shown in FIG. 3.
Figure 6:
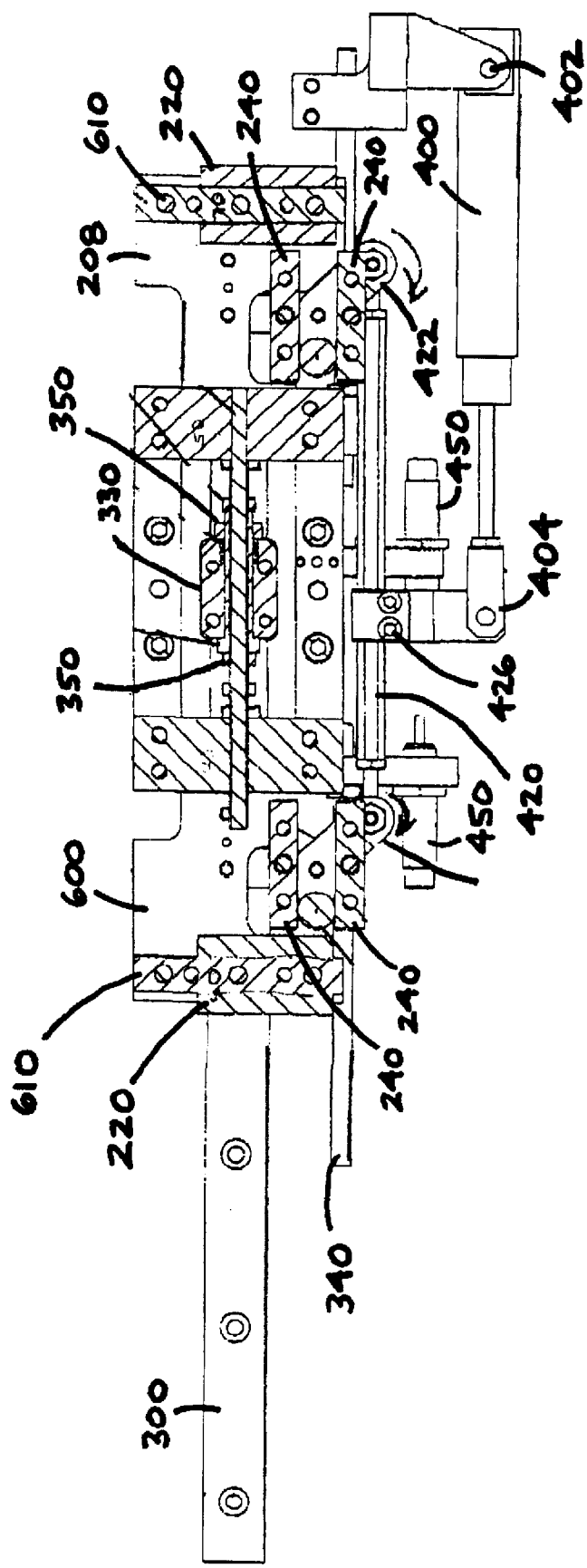
FIG. 6 is a sectional view of the backside of the subassemblies shown in FIG. 3.

As shown in FIG. 5, the fixture 100 rides on top 202 of the lift beam 200. In section view, the lift beam 200 has a top portion 202 and a bottom portion 204 perpendicular to each other, generally in the shape of an inverted L. The top 202 of the lift beam 200 features a pair of locating keys 206 that fit into the keyholes 108 of the fixture 100. The lift beam 200 also features several support flanges 205 that extend outwardly from the bottom 204 of the lift beam 200 to support the top 202 of the lift beam 200. Generally, the lift beam 200 runs the length of a side 10 of the interlocking transfer system 1 and lifts several fixtures 100 at once, advances them and then sets them down. The subassembly for lifting and advancing the fixtures will be discussed in more detail later in this detailed description.

A pair of vertical bearing rails 220 are attached to the other side 208 of the lift beam 200. These bearing rails 220 fit into the linear bearings 610, which are attached to the lift beam support plate 600, and allow nearly frictionless vertical motion of the lift beam 200 relative to the lift beam support plate 600. In the preferred embodiment, the linear bearings 610 are generally T-shaped with the top of the "T" furthest away from the lift beam support plate 600. The top of the "T" then fits within the bearing rails 220 on the back 208 of the lift beam 200. This illustration of the shape of the bearing 610 and bearing rail 220 is for purely illustrative purposes and is not meant to be a limitation. It is to be understood that any type of bearing 610 and bearing rail 220 that allows nearly frictionless movement such as is similar to the arrangement described above would work.

The vertical motion of the lift beam 200 is supplied by a cylinder and camshaft subassembly. In general, the subassembly is comprised of a cylinder 400, a clevis 410, a tie rod 420, a pivot 460, a pair of lift blocks 240 and a pair of cam levers 430. The first end 402 of the cylinder 400 is attached to the lift beam support plate 600. The second end 404 of the cylinder 400 is a clevis 410. The clevis 410 is attached to the tie rod 420 near the center 426 of the tie rod. The tie rod 420 is attached to a cam lever 430 at both of its ends 422, 424. The cam levers 430 are attached at their lower ends to the tie rod 420 and at their upper ends to the pivot 460. The pivot 460 is attached at its top to the lift beam support plate 600. The cam lever 430 is attached to a cam follower 440. The cam follower 440 is positioned between two liftbars 240. In this fashion, the horizontal motion caused by the cylinder 400 extending is transferred first to the tie rod 420 and then to the cam lever 430. The cam lever 430 engages the cam follower 440, which raises the liftbar 240, which in turn lifts the lift beam 200.

The interlocking transfer assembly 1 of the present invention also provides for adjustable vertical motion of the fixtures. In other words, one side of the device may lift a fixture 100 two inches, while the adjacent side lifts the fixture 100 only one inch. This would allow a manufacturer to use pallets that are larger than standard without causing interference between the lift beam assemblies of adjacent sides.

The movement of the cylinder 400 is contained within a pair of shocks 450. The shocks 450 act to reduce the impact caused when the cylinder 400 cycling back and forth to lift and lower the fixtures 100 and can be of various strengths depending on the load on the fixture 100 and the speed with which the interlocking transfer device 1 is used. A shock or a group of shocks 250 may also be positioned underneath the lift beam 200 to absorb the impact of descending fixtures 100.

The movement of the cylinder 400 is regulated by a sensor (not pictured). This sensor can be electronic or mechanical. The sensor detects the amount of air entering or escaping the cylinder 400. It then uses this information to determine and regulate the amount of stroke the cylinder 400 uses. In the preferred embodiment, this stroke information can be relayed to a central processor (not pictured) that coordinates the entire device 1 so that the cylinder 400 on each side of the assembly 1 operates in a coordinated fashion with the other cylinders.

The horizontal motion of the interlocking transfer system can be supplied in one of several ways. However, the hardware that the device of the present invention employs remains generally the same. The device of the present invention employs a horizontal transfer rail 300. This transfer rail 300 runs the length of the maximum possible stroke to be used in the device. The stroke will be discussed in more detail later in this detailed description. In one preferred embodiment, the transfer rail 300 has three distinct parts. In section view, the transfer rail has a first thick end 302, which abruptly tapers to a flat midsection 306 and a second thick end 304. The transfer rail 300 generally functions to allow the carriage 310 to slide back and forth horizontally in a nearly frictionless fashion.

The carriage 310, by means of components to be later described, supports the lift beam support plate on the transfer rail 300. Because the majority of the weight on the lift beam 200 is not directly over the carriage 310, the unique shape of the transfer rail 300 allows the bearings within the carriage 310 to be placed at an angle to the vertical. This eliminates side-loading conditions, which could lead to increased friction between the carriage 310 and the transfer rail 300, or even binding. The carriage 310 contains several bearings (not shown) that enable the carriage 310 to slide nearly without friction along the transfer rail 300.

The carriage 310 is attached to an adapter plate 320. The adapter plate 320 provides a mechanism for centering the lift beam 200 so that it does not interfere with the motion of the other lift beams. In one embodiment, this adjustment mechanism features a spring-loaded adjustment block 330 that can be moved along a threaded rod 340 by variously loosening and tightening the hex jam nuts 350 at either end of the adjustment block 330. Moving the adjustment block 330 moves the lift beam 200 horizontally with respect to the carriage 310. The adjustment feature allows an operator to quickly and easily move the lift beam 200 so that it is centered. Unless the lift beam 200 is centered, it may grind into the frame of the assembly or interfere with other lift beams.

Figure 3:
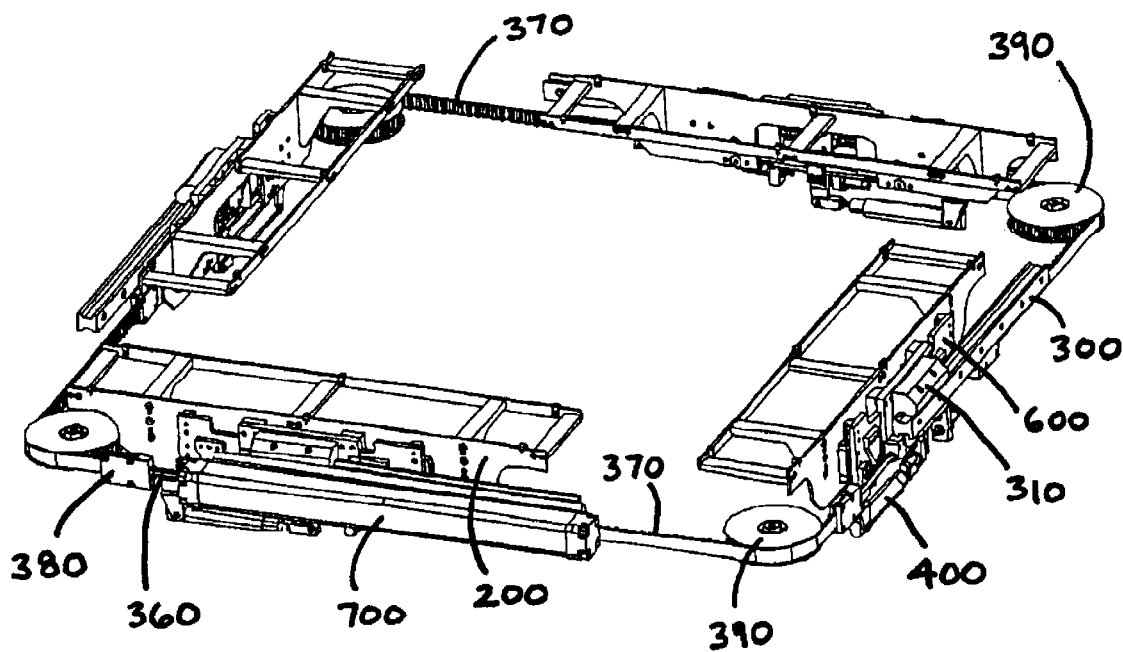
FIG. 3 is a front perspective view showing the internal workings of the system shown in FIG. 1.
Figure 4:
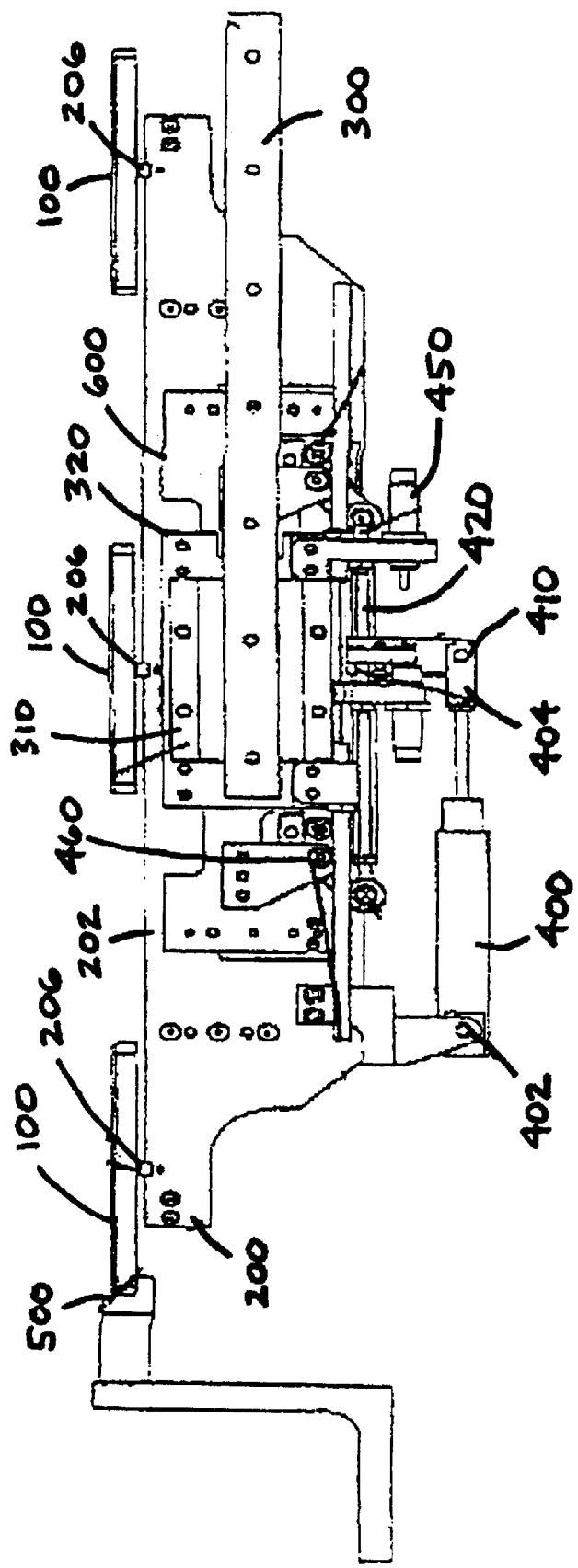
FIG. 4 is an enlarged elevational view of the lift beam and carriage subassemblies of the system shown in FIG. 1.

As shown in FIG. 3, one embodiment of the interlocking transfer system requires only a single external cylinder 700 to operate the horizontal component of motion on all four sides of the device. This particular embodiment of the device of the present invention provides for a threaded rod and belt design to transfer the horizontal reciprocating motion provided by the external cylinder 700. The threaded bolt 360 runs through the carriage and comes out each end of the carriage 310. Each end of the threaded bolt 360 is attached to an adjustable clamp 380. The adjustable clamp 380 is used to hold a belt 370. The clamp 380 must be adjustable so that the tension on the belts 370 can be equalized throughout the interlock transfer system 1. The belt 370 is actually a studded belt so that the adjustable clamps 380 and the carriage 310 have a positive grip on the belt 370. The belt 370 is used to transfer the horizontal motion of the external cylinder 700 around 90° corners to each particular carriage 310 located on the interlocking transfer assembly 1.

The interlocking transfer system is truly horizontally interlocked. The device of the present invention calls for the belt 370 to transfer around corners using pulleys 390 so that one power source can handle all of the horizontal motion requirements for the system.

The above embodiment featuring the belt is again meant as an illustration and not a limitation of the device of the present invention. The inventor has already envisioned the use of a chain drive, a belt drive and a steel band drive for use with the interlocking transfer system instead of the above-described timing belt.

The interlocking transfer system generally employs the following cycle, when the lift beam 200 is in the up position, the external cylinder 700 extends, providing horizontal motion for the fixtures 100. When the fixtures 100 are over their new stations, the lift beam 200 descends and places the fixtures 100 onto the transfer rails 500. The external cylinder 700 then contracts to the original, or home position.

Changing the timing of the vertical motion cylinders 400 with respect to the external cylinder 700 reverses the direction of the pallets. Thus, the device of the present invention can be operated in both a clockwise and a counterclockwise motion without any changes in tooling.

In another embodiment, the device of the present invention may be manually activated. In still another embodiment, a servomotor powers the device of the present invention. A servo motor offers several unique advantages, including the ability to stop and start within each stroke of horizontal motion. To illustrate, if the required stroke is ten inches, a servomotor could stop at each inch interval if a manufacturer so desired. A standard motor could also provide the horizontal motion of the carriage.

While the invention has been described in connection with what is presently considered the most practical embodiment and preferred embodiment, it is to be understood that the invention is not to be limited to the disclosed embodiments. On the contrary, it is intended to cover various modifications and equivalent arrangements included within the spirit and scope of the appended claims which scope is to be accorded the broadest interpretation so as to encompass all such modifications and equivalent structures as is permitted under the law.

The principles of this invention having been fully explained in connection with the foregoing, I hereby claim as my invention:

1. An interlocking transfer system for moving a plurality of fixtures along a continuous closed path comprising a horizontal frame having a plurality of adjacent sides wherein each side is perpendicular to the previous side and wherein the junction of two ends of each side forms a corner, means for supporting said plurality of fixtures;

means fix moving said plurality fixtures horizontally along said closed path, means for moving said plurality of fixtures vertically, and means for coordinating said horizontal and vertical movement means.

2. The interlocking transfer system of claim 1 wherein said fixtures stop for a period of time and then move again, and said fixture support includes a pair of generally parallel horizontal transfer rails upon which the fixtures rest when they are stopped.

3. The interlocking transfer device of claim 1 wherein said horizontal movement means includes:

a carriage for each of said sides, a rodless reciprocating cylinder having a first end attached to the frame of the interlocking transfer system and a second end attached to one of said carriages, a plurality of belts, each belt connecting one of the carriages to the next adjacent carriage such that a continuous closed loop is formed by the plurality of carriages.

a plurality of pulleys with one pulley stationed at each corner of the interlocking transfer system.

wherein the belt between any two of said carriages encircles at least a portion of a pulley and transfers the reciprocating motion of the external cylinder to all of the carriages.

4. The interlocking transfer device of claim 3 wherein the vertical movement means includes:

a carriage frame for each carriage, a reciprocating cylinder for each carriage with a first end attached to the carriage and a second end, a pair of cam levers for each carriage, each cam lever having a first and a second end, a tie rod for each carriage, each tie rod having a middle portion, a first end and a second end, said cylinder being attached to the middle portion of the tie rod and the first and second ends being attached to the second end of the cam levers, a lift beam for each carriage with a first end and a second end, said lift beam including a pair of horizontal lift blocks for each carriage on the back of said lift beam, a pair of cam followers for each carriage, each cam follower having a first end attached to each of said cam levers and a second end located between the lift locks, wherein the horizontal motion of the reciprocating cylinder moves the tie rod horizontally, thereby pushing the cam levers, and causing the cam follower to either lift or lower the lift blocks, whereby the horizontal motion of the cylinder is converted to reciprocal vertical motion of the lift beam.

5. The interlocking transfer system of claim 4 wherein said coordinating means consists of a plurality of sensors that sense the position of said horizontal cylinder and said lift cylinder and a means for controlling the motion of the vertical lift cylinders as well as the horizontal cylinder so that when the lift cylinders lift the fixtures, the horizontal cylinder extends, advancing the fixtures, the lift cylinder retracts replacing said fixtures on said frame and then said horizontal fixture retracts.

6. The interlocking transfer system of claim 5 wherein the fixtures may move in a clockwise or counterclockwise direction by readjusting the timing of the lift cylinder in relation to the external cylinder and without any changes in tooling.

7. The interlocking transfer system of claim 6 wherein the belt consists of a steel band.

8. The interlocking transfer system of claim 7 wherein each of said fixtures features keys which fit into keyholes op the frame of the interlocking transfer system and on the lift beams.

9. The interlocking transfer system of claim 8 wherein horizontal motion is provided by a servo motor attached to one of said pulleys for rotating one of said pulleys.

10. The interlocking transfer system of claim 9 wherein the fixtures have bushings that permit precise location of the fixtures.

11. The interlocking transfer system of claim 10 wherein the fixtures are located between rough locating pads.

12. The interlocking transfer system of claim 11 wherein the stroke length of the horizontal cylinder is adjustable to accommodate different sized fixtures and production needs.

13. The interlocking transfer system of claim 12 wherein the stroke length of the lift cylinder is adjustable so as to alter the height that the lift beam is able to raise the fixtures.

14. An interlocking transfer system having a plurality of mutually perpendicular sides, said mutually perpendicular sides combining at a plurality of corners, said interlocking transfer system comprised of a plurality of fixtures, a frame, a plurality of transfer rails attached to said frame, a plurality of lift beams, a plurality of carriages that slide along said transfer rails, a plurality of lift cylinders attached to said plurality of carriages, a plurality of cam assemblies attached to said plurality of lift cylinders whereby the horizontal motion of the cam assemblies is converted to vertical motion and raises said liftbeams, a plurality of pulleys, one of said plurality of pulley being located at each corner, a plurality of belts that encircle said plurality of pulleys and that connects each of said carriages together so that they move generally uniformly, and an external rodless cylinder attached to one of said carriages that provides horizontal motion to each of said plurality of carriages as they are connected by said belt.

15. The interlocking transfer system of claim 14 wherein said lift cylinder extends activating said cam assembly and lifting said lift beam and fixtures followed by said rodless cylinder advancing said fixtures, said lift cylinder retracting and thus lowering said lift beam and fixtures, and said rodless cylinder retracting to its original position.

16. The interlocking transfer system of claim 15 including a means for coordinating the cycle of extending said lift cylinder and said external cylinder.

17. The interlocking transfer system of claim 16 wherein the fixtures may move in a clockwise or counterclockwise direction by readjusting the timing of the lift cylinder in relation to the external cylinder and without any changes in tooling.

18. The interlocking transfer system of claim 17 wherein the belt consists of a steel band.

19. The interlocking transfer system of claim 18 wherein each of said fixtures features keys which fit into keyholes on the frame of the interlocking transfer system and on the lift beams.

20. The interlocking transfer system of claim 19 wherein horizontal motion is provided by a servo motor attached to one of said pulleys and for rotating one of said pulleys.

21. The interlocking transfer system of claim 20 wherein the fixtures have bushings that allow precision manufacturing devices to operate without lifting and locating the product.

22. The interlocking transfer system of claim 21 wherein the fixtures are located between rough locating pads.

23. The interlocking transfer system of claim 22 wherein the stroke length of the horizontal cylinder is adjustable to accommodate different sized fixtures and production needs.

24. The interlocking transfer system of claim 23 wherein the stroke length of the lift cylinder is adjustable so as to alter the height that the lift beam is able to raise the fixtures.

* * * * *

UNITED STATES PATENT AND TRADEMARK OFFICE
CERTIFICATE OF CORRECTION

PATENT NO. : 6,640,962 B1  
APPLICATION NO. : 09/965382  
DATED : November 4, 2003  
INVENTOR(S) : Richardson Page 1 of 1

It is certified that error appears in the above-identified patent and that said Letters Patent is hereby corrected as shown below:

Title Page, Item (75) Inventors:
Add inventor to patent: Add --Brandon Richardson, 45579 Elmwood Circle, Canton Township, MI (US) 48188--

Signed and Sealed this

Fifteenth Day of January, 2008

JON W. DUDAS  
*Director of the United States Patent and Trademark Office*